United States Patent [19]
Pocrnja et al.

[11] 3,952,950
[45] Apr. 27, 1976

[54] APPARATUS FOR DEFOGGING A ROADWAY, LANDING STRIP OR THE LIKE

[75] Inventors: Anton Pocrnja; Heribert Wenzel, both of Munich, Germany

[73] Assignee: Linde Aktiengesellschaft, Wiesbaden, Germany

[22] Filed: May 9, 1975

[21] Appl. No.: 576,116

Related U.S. Application Data

[62] Division of Ser. No. 485,000, July 1, 1974, abandoned, which is a division of Ser. No. 360,909, May 16, 1973, Pat. No. 3,851,822.

[30] Foreign Application Priority Data

| May 19, 1972 | Germany | 2224657 |
| May 19, 1972 | Germany | 2224671 |
| May 19, 1972 | Germany | 2224672 |

[52] U.S. Cl. ............................. 239/14; 239/2 R
[51] Int. Cl.² .................. A01G 15/00; E01H 13/00
[58] Field of Search............. 159/20 R; 239/2 R, 14; 62/6, 90, 282, 272, 57; 244/114; 261/11

[56] References Cited
UNITED STATES PATENTS

| 2,570,226 | 10/1951 | Geiringer | 239/2 R |
| 2,969,920 | 1/1961 | Giannoni | 239/14 |
| 3,118,604 | 1/1964 | Bertin et al. | 239/2 R |
| 3,598,313 | 8/1971 | Plattner | 239/2 R |
| 3,712,542 | 1/1973 | Price, Jr. | 239/2 R |
| 3,851,822 | 12/1974 | Pacrnja et al. | 239/2 R |

*Primary Examiner*—Lloyd L. King
*Attorney, Agent, or Firm*—Karl F. Ross; Herbert Dubno

[57] ABSTRACT

A multiplicity of defogging devices, each having a closed refrigeration system, are arranged in two rows on opposite sides of an elongated strip to be maintained free from fog. The direction of the jet of each individual defogging device is determined by the wind direction and the location of the device in relation to the rest of the defogging devices in its row. The strength of the jets (outlet force or velocity) of the defogging devices of each row is determined by the wind velocity. The ratio between the strength of the jets of the defogging devices on the leeward side of the covered region and the strength of the jets of the defogging devices on the windward side therof is higher than 1 and is increased with increasing wind velocity.

22 Claims, 5 Drawing Figures

APPARATUS FOR DEFOGGING A ROADWAY, LANDING STRIP OR THE LIKE

This is a division of application Ser. No. 485,000, filed July 1, 1974, now abandoned, which was a division of application Ser. No. 360,909, filed 16 May 1973, now U.S. Pat. No. 3,851,822, issued 3 Dec. 1974.

FIELD OF THE INVENTION

The present invention relates to a method and an apparatus for defogging the air in an elongated region, e.g. the landing strip of an airport or a roadway, with defogging and dehumidifying devices operating with a refrigerant cycle.

BACKGROUND OF THE INVENTION

Defogging and dehumidifying devices are known in which air of a foggy region, generally with a relative humidity of 100 percent is drawn into contact with a condenser and subsequently an reheater both of which are parts of a closed refrigeration system or refrigerant cycle. The air leaves the defogging device as an unsaturated and slightly heated air stream. The blow is disposed in the downstreamm portion of the defogging device.

It is known in the art to use the above-described defogging devices for the defogging of small regions. Humid air is passed through the device and moisture in the foggy air is condensed or even frozen to ice at a heat exchange in which the refrigerant is vaporized and therefore abstracts heat from the humid air. In the downstream heat exchanger, at which the refrigerant is condensed after compression, the dehumidifier air recovers heat from the refrigerant. The air stream which leaves the defogging device is thus unsaturated and slightly warmer than the ambient foggy air.

This heat gain is a disadvantage in the known air-dehumidifiers for closed rooms, and a heating of such rooms must be prevented by heat removal. However, with the above-described defogging device the heat gain may be somewhat advantageous since it allows ambient air of a high relative humidity to mix with the unsaturated air and maintain the region covered by the emerging air mixture free from fog.

The temperature of the inlet and the outlet of a defogging device adjusted when it is necessary to compensate for for varying temperature and humidity of the ambient air to be be defogged.

The above-described defogging devices are highly effective for limited areas, but do not fully meet the more stringent requirements for large regions, i.e. airstrips of airports and highway stretches. The reason for this is that the effectivity of each individual defogging device and the joint defogging device is detracted from the variations in climatic conditions, which seldom are constant.

OBJECTS OF THE INVENTION

The principal object of the invention is to provide an improved method of and apparatus for the defogging of large elongated regions effectively and to thereby overcome the effects of variations in climatic conditions which has hitherto inhibited the use of such conventional devices using a closed refrigerant cycle.

It is also an object of this invention to accomplish an effective defogging of large regions in an economic manner with respect to capital expenditure and, especially, energy consumption.

SUMMARY OF THE INVENTION

The above-mentioned objects are realized in accordance with with the invention by a method comprising the following steps:

jets of dehumidified air from conventional defogging devices are directed across a large elongated region from opposite longitudinal sides thereof and at spaced locations along the sides;

the strength of jets which are generally counter to the wind direction is maintained greater than jets generally in the wind direction;

at least one jet on each side is oriented generally parallel to the wind direction; and jets on either side of the one jet on each longitudinal side of the region, are oriented at increasing angles to the wind direction away from the one jet on each longitudinal side.

It has been found that the foregoing objects can be attained by providing a plurality of dehumidifying units on opposite longitudinal sides of an elongated region to be maintained, free from fog and directing jets of dehumidified air from these units across the region which may be a landing strip or a roadway. Each of the units comprises, as described, a blower inducing air flow across a first heat exchanger which acts as a condenser-/evaporator and then across a second heat exchanger which acts as a reheater/condenser, the heat exchangers being connected in a closed refrigerant loop. In the first heat exchanger the liquefied refrigerant is evaporated to cool the air to a temperature well below the dewpoint and hence condense moisture from the air. In the second heat exchanger the compressed refrigerant is liquefied or condensed while the dehumidified air is reheated. It has been found that, when the jet forces or strength is adjusted for the arrays of dehumidifying units in accordance with the wind force or velocity, and the orientations of the jets are regulated in accordance with the wind direction, both preferably automatically, the aforementioned disadvantages can be economically obviated.

With the process described the dehumidifying units are systematically controlled in response to the most significant climatic parameters, it being self-understood that an increase in the humidity of the ambient air (i.e. its moisture content and fogging potential) may automatically be detected to adjust the ratio of dehumidified air mixed with ambient, nondehumidified air. It is indeed surprising, however, that the most detrimental climatic conditions heretofore experienced in defogging selected regions, namely the windspeed and direction, can be completely compensated or rendered insignificant by the appropriate adjustment of the jet direction and force.

It is, further, an important feature of the invention that the orientation of each jet is determined, in part, by the orientation of the adjacent jet or jets of the respective array and its position in the array as discussed in greater detail below.

More specifically, a multiplicity of defogging devices are placed in two substantially straight rows along the two longitudinal sides of the large region. One defogging device in each row in the middle thereof or substantially in the middle thereof is oriented to be parallel to the wind direction. Defogging devices on each side of these two devices are oriented at increasing angles to the wind direction away from these two devices, the net result being two fan-like patterns of jets when the defogging devices are operated.

The defogging devices must in accordance with our invention be operated systematically, due consideration being paid to those climatic parameters which are of significance for defogging operations. Thus, we quite surprisingly found that an effective, reliable and uniform, defogging of a large region can only be accomplished when the jet direction of the individual defogging devices is determined by the wind direction and the jet strength of the individual defogging devices are determined by the prevailing wind velocity.

As indicated in the foregoing, when there is a prevailing wind through the region to be defogged, the middle defogging device in the row on the windward side of the region should be oriented in a direction parallel to the wind direction, and the middle defogging device in the row on the leeward side of the region in a direction exactly opposite to the wind direction. In addition, the jets, oriented generally in a fan pattern, on the windward side whould be spread out more than the fan pattern of the jets on the leeward side. More specifically, the angle between the two outermost jets on the leeward side and the middle jet is approximately 20° to 50°, preferably 35°, and the angle between the two outermost jets on the windward side and the corresponding middle jet is approximately 10° to 20°, preferably 15°, larger than the aforementioned angle on the leeward side of the region.

When also the ratio of the total jet strength of the defogging devices on the leeward side and the total jet strength of the defogging devices on the windward side is carefully adjusted to a value greater than 1, depending upon the prevailing wind strength, surprisingly effective defogging of large elongated regions can be accomplished.

When reference is made to a ratio of greater than unity for the jet strength on opposite sides of the region, is is intended to so indicate that the total force of the jets of the nozzles at one side is greater than the total force of the jets at the other side. The total force of the jets on the lee side is thus greater than the total force of the jets on the windward side and this may be accomplished where equal numbers of jets are provided on both sides, by positioning the dehumidifying units directly opposite one another and having the individual jet forces of opposite units in the same ratio.

This method of defogging can of course also be used when it is substantially calm, i.e. when the wind velocity is substantially zero. The arrangement of the two rows of defogging devices will then be symmetrical along a line connecting the midpoints of each row of defogging devices. The direction of a middle jet in each row is normal to the two longitudinal sides of the elongated region. Further, the angle between two outermost jets and the corresponding middle jet on either side of the region can be approximately 30° to 60°, preferably 45°C.

Another advantageous feature of this invention can be realized with a defogging device having a condenser, an reheater and a blower, the blower being downstream of the reheater and the reheater being downstream of the condenser, and an air inlet tube between the blower and the reheater by introducing additional foggy air through the inlet duct. The amount of such air is controllable by a valve or shutter arrangement.

It is thereby possible to adjust the amount of air per unit time which flows through the condenser and the reheater in relation to the climatic variations of the region, and thereby limit the energy consumption in the cloosed refrigeration system to what is absolutely necessary for an effective defogging. This measure is of particular value when the fog density is low and the full capacity of the defogging device does not have to be used but when the wind conditions are such that the jet strength of the defogging device must exceed a minimum value.

It is particularly advantageous if the amount of the foggy air introduced between the reheater and the blower can be automatically controlled.

Energy utilization can also be improved considerably by spraying the surface of the condenser with an antifreeze agent (e.g. ethyleneglycol) whenever ice formation appears thereon or the surface tends to have a temperature below 0°C. Such spraying can also be done automatically by using a temperature sensing device on the surface of the condenser.

The present method of and apparatus for defogging are particularly meritorious where the elements of each defogging device can be automatically controlled. Thus, we contemplate the use of several control circuits. One of them consists of a wind direction meter, a signal coverter with a calculator or computer connected thereto to determine a suitable jet direction for each and all of the defogging devices and drivers controlled thereby to orient the defogging devices in their proper directions respectively. Another control circuit consists of a wind velocity meter, a signal converter and calculator or computer to determine the required jet strength of the defogging devices in each row respectively, and drivers controlled thereby to adjust the jet strength of the defogging devices in each row.

The terms calculator/computer and arithmetic unit are used herein to refer to any conventional programming circuit having predetermined thresholds or set-point values for each unit and a number of positions thereof which are compared with the input value and provide an output signal which is transmitted to the driver to adjust the position of the nozzle until the input signal is brought into conformity with the set-point signal and the output or error signal is nullified. Suitable devices for this purpose are described in SERVO-MECHANISM PRACTICE, McGraw-Hill Book Co. N.Y.

The housing of a defogging device can, like conventional defogging devices, having a housing with two open ends. The first element of the defogging device upstream is the condenser, and downstream there is provided in succession, the reheater and the blower as mentioned in the foregoing. An inlet tube for the introduction of additional foggy air is provided between the reheater and the blower as indicated in the foregoing. The inlet tube has a controllable closure member, preferably automatic. The closure member can be automatically controlled by a fog density meter, a signal converter with an arithmetic unit and a driver accuating the closure member of the inlet tube.

A liquid distributor for antifreeze agent placed in front of the condenser preferably has spraying nozzles which uniformly distribute antifreeze agent over the surface of the condenser whenever ice formation on the surface of the condenser appears or the temperature on the surface falls below 0°C. A shut-off valve or stopcock can be incorporated between the container of antifreeze agent and the distributor, and whenever a need for antifreeze agent arises the shut-off valve will be actuated automatically, i.e. opened. The surface of the condenser can have a thermoelement connected to a control switch and a driver controlled thereby. The driver is actuated when the temperature on the surface of the condenser falls below 0°C.

The energy utilization and the effectivity of the defogging devices of our invention can also be improved by providing a droplet separator between the condenser and the reheater. The droplet separator collects moisture which has not been collected in the condenser. This double fog separation provides under unchanged defogging capacity of the defogging device a decrease in the power consumption of the closed refrigeration system. Such a decrease can be more than 10 percent. It is preferable to also provide the droplet separator with an antifreeze agent distributor, because ice can also appear on it. Spraying nozzles can be used and a shut-off valve for supply of antifreeze agent with an automatically controlled driver for the shut-off valve.

The use of defogging systems of this invention as described in the foregoing, e.g. on airstrips of airports, allows an automatic, very reliable defogging, regardless of the climatic conditions and swift variations encountered. An arrangement in accordance with this invention with a multiplicity of defogging devices can be modified by placing defogging devices with blowers without any refrigeration elements built in or by inserting blowers without any refrigeration elements between the defogging devices of the system, especially when the fog density is low and the wind velocity is high. The energy utilization and the effectivity of the defogging system will thereby be considerably improved.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
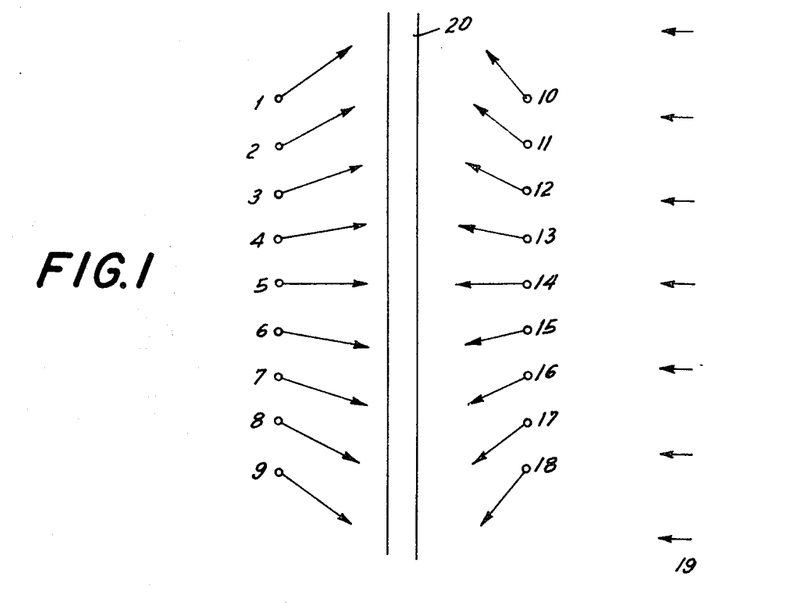
FIG. 1 is a diagrammatic plan view which shows one arrangement of defogging devices in accordance with our invention for defogging an airstrip of an airport with a prevailing sidewind.

Referring now to FIG. 1, defogging (dehumidifying) devices 1–18 of the invention (See FIG. 5) are arranged in two rows along the longitudinal sides of elongated air strip 20. Foggy air is heated in each defogging device 1–18 by means of a closed refrigeration system, also converted to an unsaturated, dehumidified state, and blown across air strip 20 by means of a blower.

Such an open system of working defogging devices 1–18 is of particular advantage. The heat gain and the unsaturated state of the air leaving the defogging device, in combination, makes possible not only defogging of air passing through the defogging devices 1–18 but also the defogging of considerable amounts of ambient foggy air with which the heated dehumidified air comes in contact. Vectors at 19 indicate that a light side wind is prevailing, with a direction normal to the long sides of airstrip 20.

The orientation of the jet of each individual defogging device 1–18 is determined by the direction 19 of the prevailing wind and by the location of the defogging device in relation to other defogging devices in its row. The jet direction of each individual defogging device 1–18 is indicated by a vector, showing a direction as well as a strength or a strength relation. According to a particularly preferred embodiment of our invention, the jet directions of the defogging devices 1–9 on the leeward side of air strip 20 are arranged in such a way, that the jet direction of the middle defogging device 5 is exactly opposite to the direction of the prevailing wind 19, and the jet directions of devices 4–1 and 6–9 are oriented on either side of device 5 at uniformly increasing angles to the wind direction away from the jet direction of device 5. The two outermost devices 1 and 9 of the row 1–9 have jets with a direction which forms an angle of 35° with the direction of the jet coming from the middle device 5.

On the windward side of air strip 20, the jet of the middle defogging device 14 is oriented in the direction 19 of the prevailing wind across air strip 20, while the directions of the jets of the rest of the defogging devices 13–10 and 15–18 are arranged in the same manner as on the leeward side, with the important exception that the angles between successive jet directions increase to a greater extent on the windward side than the leeward side. Devices 10 and 18 in the row on the windward side have jets with a direction which forms an angle of 50° with the direction of the jet of middle device 14.

The strengths of defogging devices 1–9 and 10–18 are determined by the velocity of the prevailing wind. The strength and also the direction of the wind are indicated by vectors 19. The said wind is relatively slight, but its strength is reflected in a ratio between the strengths of jets from devices 1–9 on the leeward side and the strengths of jets from devices 9–18 on the windward side which is larger than 1.

Figure 2:
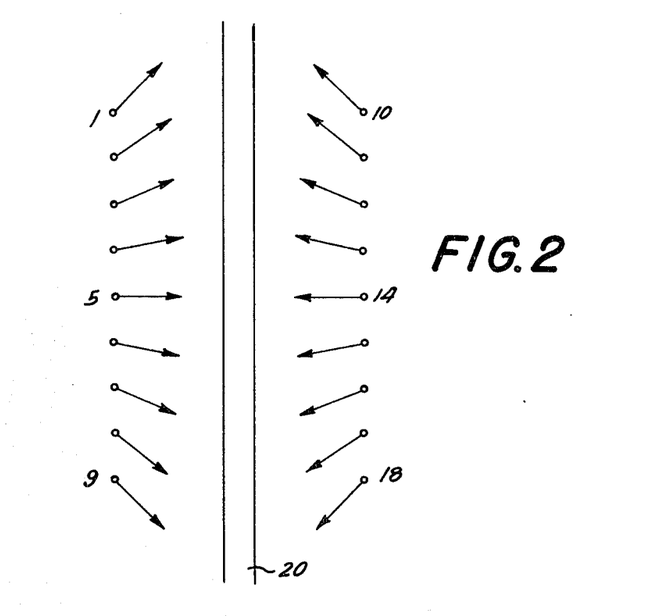
FIG. 2 is a diagrammatic plan view which shows another arrangement in accordance with the invention when the weather is calm.

FIG. 2 illustrates how the defogging devices can be used when the weather is calm. 18 defogging units (1–18) are used as in FIG. 1. However, now the jet directions and the strengths of the individual defogging devices can be arranged in a completely symmetrical manner in relation to airstrip 20. Further, the angle between the jets coming from uttermost defogging devices 1,9,10 and 18 and the jets coming from the two middle defogging devices 5 and 14 respectively, can be approximately 45°C.

Figure 3:
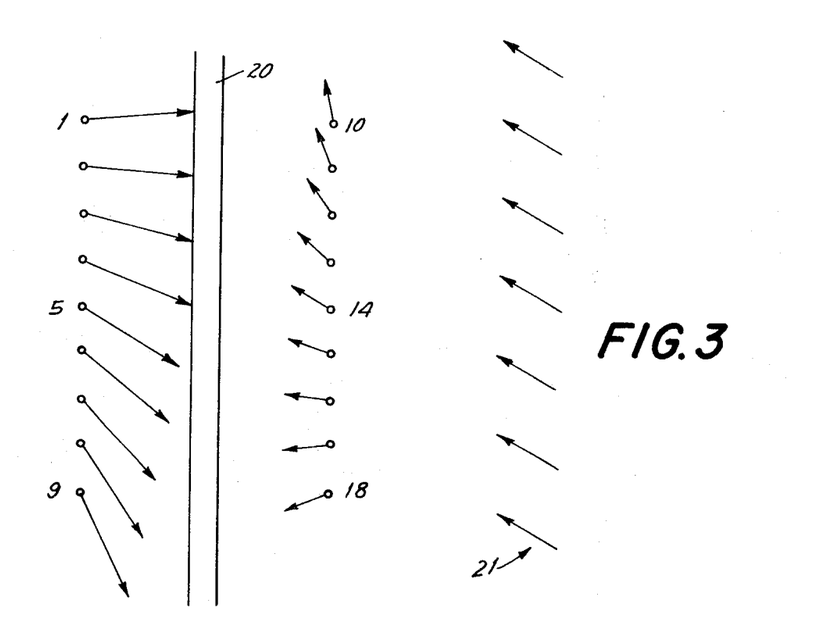
FIG. 3 is a diagrammatic plan view which shows another arrangement in accordance with the invention, with a prevailing relatively strong wind, approaching one of the longitudinal sides of the airstrip at an angle of 60°.

FIG. 3 illustrates how the defogging devices can be arranged when a rather strong sidewind is prevailing. Vectors 21 indicate the direction of the wind, 60° between the same and a long side of the air strip 20, and its strength. 18 defogging devices (1–18) are used as indicated in the foregoing. The jets of the two middle defogging devices 5 and 14 are oriented in the wind direction, while the jets of the lateral devices 4–1, 6–9, 10–13 and 15–18 are oriented as indicated in the foregoing at increasing angles to the wind direction away from the jets coming from devices 5 and 4 respectively. The directions of the jets of the two uttermost defogging devices 1 and 9 on the leeward side of air strip 20 form with the direction of the jet from device 5 and an angle of 35°. On the windward side, the directions of the jets from devices 10 and 18 form with the jet direction of device 14 an angle of 50°.

Figure 4:
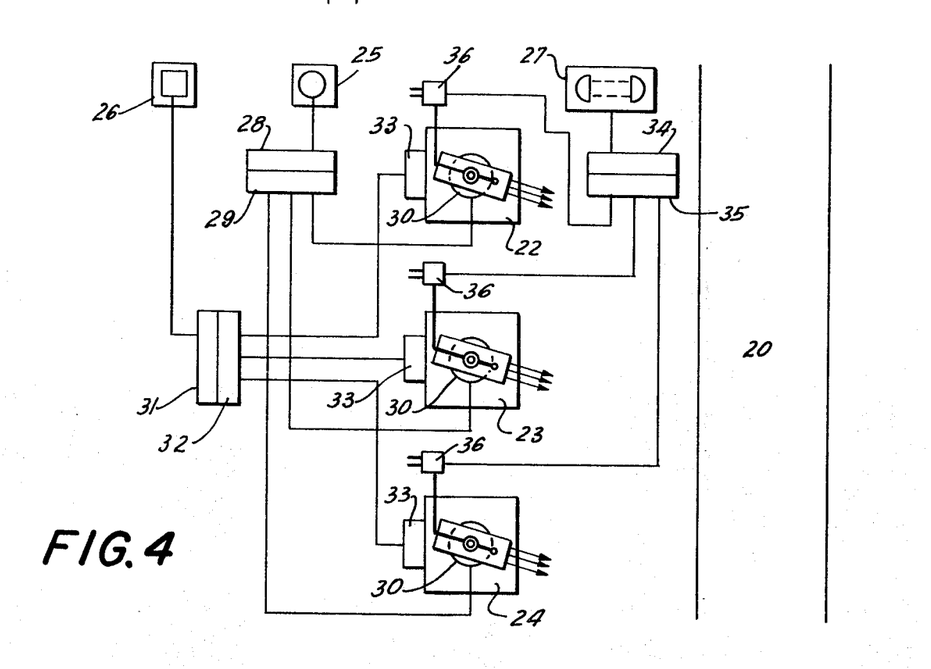
FIG. 4 is a block diagram which shows a conrol system used when operating a defogging system in accordance with the invention.

FIG. 4 shows a particularly advantageous automatic arrangement to be used to coordinate the functions of the individual defogging devices in two rows along an elongated foggy region. For reason of simplicity, only three defogging devices 22, 23 and 24 have been selected to show how they can be automatically controlled by three automatic systems. Such an arrangement for automatic control can of course be extended to include all defogging devices used, in an effort to defog a region, e.g. all 18 devices shown in FIG. 1. Where desired, alternate devices or units 1–18 can simply be blowers without refrigerating units.

The illustrated arrangement includes three metering devices or meters, namely a wind direction meter 25, a wind velocity meter 26 and a fog density meter 27. Meter 25 is connected to a signal converter 28 a signal which corresponds to the wind direction. The signal is fed to a programmed arithmetic unit 29 which issues signals to the three drivers 30 to individually determine the directions of the three jets emerging from defogging devices 22, 23 and 24 respectively.

The wind velocity is determined with wind velocity meter 26 which issues signals corresponding to the wind velocity to a second signal converter 31. A second programmed arithmetic unit 32, connected to meter 26, issues signals to drivers 33 so that the strengths of the jets of defogging devices 22, 23 and 24 can be adjusted.

The fog density meter 27, e.g. an optical device, issues signals corresponding to the prevailing fog density to a third signal converter 34, which is connected to a third programmed arithmetic unit 35. Drivers 36 are controlled by arithmetic unit 35 and regulating in their turn the amount of ambient foggy air which can be introduced between the evaporator and the blower of each individual defogging device 22–24. Such automatic control is particularly advantageous when the fog density is small and the wind is strength so that the energy utilization of the total defogging arrangement can be optimized.

Figure 5:
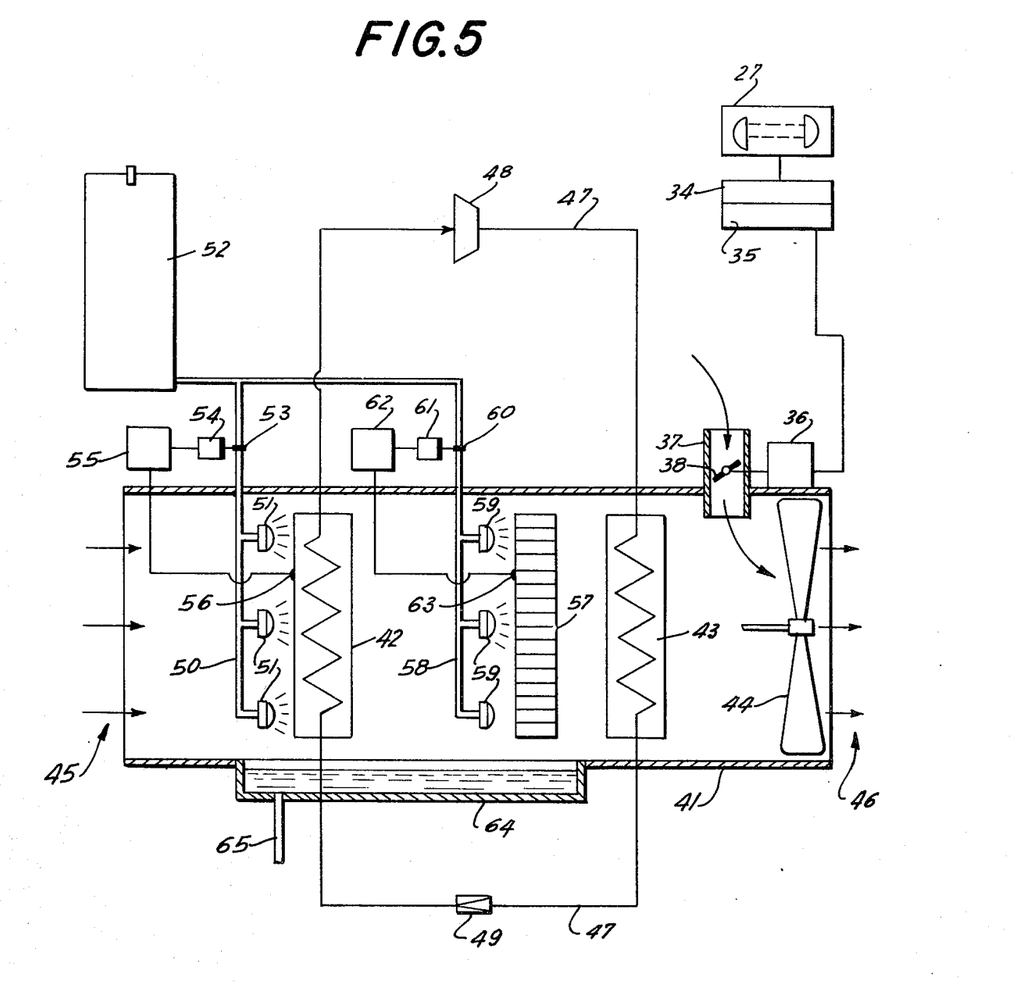
FIG. 5 is an axial cross-sectional view, partly in diagrammatic form which shows a defogging device in accordance with the invention.

FIG. 5 shows a defogging device in accordance with the invention, comprising a housing 41, a condenser 42, a reheater 43, and a blower 44, taken in the downstream order. Housing 41 is open at the upstream as well as the downstream sides. Foggy air enters at 45 into housing 41, passes condenser 42, resulting in water condensation due to refrigeration, passes reheater 43 resulting in heating and leaves housing 41 at 46 dry and warm. The air at 46 is warmer than the foggy air entering housing 41 at 45 and is unsaturated. Thus, it has capability to defog ambient foggy air which has not passed any of the defogging devices in the arrangement. Condenser 42 and reheater 43 are integrated elements of a closed refrigeration system comprising also a refrigerant compressor 48 and an expansion valve 49.

Housing 41 has an inlet tube 37 for the introduction of additional ambient air between reheater 43 and blower 44. Inlet tube 37 has a closure member 38 which controls the amount of additional air, e.g. a shutter which varies the open cross-section of inlet tube 37.

It is particularly advantageous to actuate closure member 38 with a driver 36 which is controlled by an arithmetic unit 35. Arithmetic unit 35 can be programmed by a calibration process to arrive at optimal adjustments of closure member 38. Signals are issued to arithmetic unit 35 by a signal converter 34, which receives primary signals from a density meter 27, e.g. an optical device.

This system, comprising the elements 27 and 34-38, allows the maintenance of a constant strength of the jet leaving housing 41 at 46. The energy utilization as far as the closed refrigeration system 47 is concerned can thereby be varied and optimized.

According to another preferred feature of this invention, a liquid distributor 50 which spraying nozzles 51 can be placed upstreams of condenser 42 to distribute an antifreeze agent onto the surface of condenser 42. Supply container 52 is filled with antifreeze agent, e.g. a 20 percent water solution of ethylene glycol. The conduit connecting container 52 and distributor 50 can have a closure member 53, e.g. a stopcock, which is actuated when the surface temperature of condenser 42 falls below 0°C. Stopcock 53 can be actuated with driver means 54, which opens or closes stopcock 53 when thermoelement 56 registers allowable and not allowable temperatures respectively of the condenser surface and signal transmitter 55 converts these registrations to signals which control driver means 54.

FIG. 5 shows also a droplet separator 57 between condenser 42 and reheater 43. Droplet separator 57 is, like condenser 42, provided with a deicing device. Liquid distributor 58 has spraying nozzles 59, a closure member 60 controlled by a driver 61, a signal transmitter 62 and a thermoelement 63.

FIG. 5 also shows a storage sump 64 under condenser 42 and droplet separator 57 to collect condensed and melted water. It is provided with an outlet 65.

The energy consumption and the cost are surprisingly low when arrangements of defogging devices as described in the foregoing are used. Hence, such arrangements have proved to be most valuable for defogging large regions such as air strips on airports and stretches of highways, where energy utilization becomes extremely important. Also, our defogging devices do not constitute any environmental threat. They do not emit any dangerous substances or particles whatsoever to the ambient air.

EXAMPLE

A space which is defogged by the method and device of the invention can be compared to a solid body around which a stream of air flows. To illustrate this, ten defogging devices are lined up in two rows at a temperature of 10°C. The passage of air through each defogging device is 200 kg/sec. and the total passage of air is thus 2000 kg/sec. The total energy consumption of the ten devices, including refrigeration systems and blowers, is 3,600 kW. The following table shows the results obtained, with such an arrangement and under such conditions:

| g | 0.1 | 0.2 | 0.3 | 0.4 | 0.5 |
| --- | --- | --- | --- | --- | --- |
| V | $179 \times 10^6$ | $92 \times 10^6$ | $63.5 \times 10^6$ | $49 \times 10^6$ | $40.4 \times 10^6$ |
| $V_2$ | 30 | 15 | 10 | 7.5 | 6 |
| $V_1$ | | | | | |
| q | 0.017 | 0.034 | 0.049 | 0.063 | 0.077 |

The abbreviations in the Table have the following meanings:

g = amount of water in fog droplets per m³ in gram;
V = amount of defogged air in m³ per hour;
$V_1$ = amount of air passing the ten defogging devices per hour;
$V_2$ = amount of defogged air in excess of amount defogged in the defogging devices per hour;
q = energy consumption in kilo calories per m³ defogged air.

0.1 g water per m³ in the form of fog droplets corresponds to a light fog with a visual range of 100 m, while 0.4 g corresponds to a dense fog with a visual range of 12 m.

In one defogging device according to our invention the amount of passing air is 200 kg/sec and the ambient temperature is 2°C. The fog density is 0.2 g water per m³ air during one study, corresponding to a visual range of 60 m. 1500 kg/sec foggy air which is not passing the device is also defogged when it comes in contact with defogged air leaving the device. The surface temperature of condenser 42 and droplet separator 57 is −2°C, the temperature of reheater 43 is 8°C, and the temperature of the defogged air when it leaves the device is 5°C.

When inlet tube 37 is closed and no antifreeze agent is used, the total energy consumption, including the energy necessary for driving the blower, is 360 kW. This energy consumption can be lowered to 290 kW, i.e. with approximately 20 percent, without varying the resulting total amount of defogged air, by opening the inlet tube 37 for the introduction of additional air, so that the total amount of air to be defogged does not pass through condenser 42, and by preventing an ice formation from appearing on condenser 42 by spraying antifreeze agent thereon.

The inlet tube 37 is opened to such an extent that 60 kg/sec. additional foggy air is introduced therethrough, while 140 kg/sec. air passes through condenser 42. This lowering of the energy consumption can be improved still further when the fog density is slight.

When a deicing system of described type is not used under the same weather conditions, an icing of condenser 42 and droplet separator 57 occurs already after a running time of 0.5 hour, and a switch-off and a deicing of the device has to be done. Also, the energy consumption of the device must be increased when the amount of ice of condenser 42 and droplet separator 57 increases to maintain the initial defogging capacity of the device. However, when a deicing device as described in the foregoing is used, the defogging device can be operated continuously for a long time without increasing the energy consumption.

We claim:

1. An apparatus for the defogging of an elongated region, comprising:
   a respective row of blowers disposed along each longitudinal side of said region and having respective jets trained generally thereacross, the blowers of each row being oriented at progressively increasing angles away from a central blower of the respective row;
   means for dehumidifying the air fed through at least some of said blowers;
   a wind-direction detector responsive to the wind direction in said region; and
   control means responsive to said detector for orienting the blowers of said rows in dependence upon the wind direction with the central blower of each row generally parallel to the wind direction.

2. An apparatus for the defogging of an elongated region, comprising:
   a respective row of blowers disposed along each longitudinal side of said region and having respective jets trained generally thereacross, the blowers of each row being oriented at progressively increasing angles away from a central blower of the respective row;
   means for dehumidifying the air fed through at least some of said blowers; a wind-velocity detector responsive to wind force across said region; and
   control means connected to said detector for controlling the force of the jets in response to wind velocity, said control means including means for maintaining the force of the jets of said blowers on the leeward side of said region greater than the force of said jets on the windward side thereof.

3. An apparatus for the defogging of an elongated region comprising:
   a respective row of blowers disposed along each longitudinal side of said region and having respective jets trained generally thereacross, the blowers of each row being oriented at progressively increasing angles away from a central blower of the respective row;
   means for dehumidifying the air fed through at least some of said blowers;
   a fog-density detector responsive to the humidity of the air in said region; and
   control means connected to said detector for admixing nondehumidifed air with the dehumidified air emerging at said jets in said blowers in accordance with the humidity sensed by said detector.

4. An apparatus for the defogging of an elongated region, comprising:
   a respective row of blowers disposed along each longitudinal said of said region and having respective jets trained generally thereacross, the blowers of each row being oriented at progressively increasing angles away from a central blower of the respective row;
   means for dehumidifying the air ged through at least some of said blowers;
   a wind-direction detector responsive to the wind direction in said region;
   first control means responsive to said detector for orienting the blowers of said rows in dependence upon the wind direction with the central blower of each row generally parallel to the wind direction;
   a wind-velocity detector responsive to wind force across said region; and
   second control means connected to said wind-velocity detector for controlling the force of the jets in response to wind velocity.

5. An apparatus for the defogging of an elongated region, comprising:
   a respective row of blowers disposed along each longitudinal side of said region and having respective jets trained generally thereacross, the blowers of each row being oriented at progressively increasing angles away from a central blower of the respective row;
   means for dehumidfying the air fed through at least some of said blowers;
   a wind-direction detector responsive to the wind direction in said region;

first control means responsive to said detector for irienting the blowers of said rows in dependence upon the wind direction with the central blower of each row generally parallel to the wind direction;

a wind-velocity detector responsive to wind force across said region;

second control means connected to said wind-velocity detector for controlling the force of the jets in response to wind velocity, said second control means including means for maintaining the force of the jets of said blowers on the leeward side of said region greater than the force of said jets on the windward side thereof;

a fog-density detector responsive to the humidity of the air in said region; and third control means connected to said fog-density detector for admixing nondehumidified air with the dehumidified air emerging at said jets in said blowers in accordance with the humidity sensed by said fog-density detector.

6. The apparatus defined in claim 1 wherein said means for dehumidifying the air of each blower comprises:

a generally tubular housing having an inlet at one end receiving ambient air and an outlet at the other end for issuing the respective jet;

a fan in said housing adjacent said outlet;

a reheater/condenser upstream of said fan in said housing and traversed by dehumidified air therein;

a condenser/evaporator in said housing upstream of said reheater/condesner and traversed by moist air entering said housing through said inlet;

a compressor; and means connecting said compressor, said condenser/evaporator and said reheater/condenser in a closed refrigerant cycle.

7. An apparatus for the defogging of an elongated region, comprising:

a respective row of blowers disposed along each longitudinal side of said region and having respective jets trained generally thereacross, the blowers of each row being oriented at progressively increasing angles away from a central blower of the respective row;

means for dehumidifying the air fed through at least some of said blowers, said means for dehumidifying the air of each blower comprising:

a generally tubular housing having an inlet at one end receiving ambient air and an outlet at the other and for issuing the respective jet;

a fan in said housing adjacent said outlet;

a reheater/condenser upstream of said fan in said said housing and traversed by dehumidified air therein;

a condenser/evaporator in said housing upstream of said reheater/condenser and traversed by moist air entoring said housing through said inlet;

a compressor; and means connecting said compressor, said condenser/evaporator and said reheater/condenser in a closed refrigerant cycle;

a duct communicating with said housing between said fan and said reheater/condenser for admitting ambient air to said housing and admixing it with the reheated dehumdified air prior to formation of the jet issuing from said outlet;

closure means on said duct for controlling the admixture of ambient air with the reheated dehumidifed air;

a fog-density detector responsive to the humidity of the air in said region; and control means connected to said fog-density detector for operating said closure means in response thereto.

8. The apparatus defined in claim 6, further comprising:

a reservoir containing an antifreeze agent;

means communicating with said reservoir for dispensing said antifreeze agent on a surface of said condenser/evaporator;

closure means between said reservoir and the last-mentioned means for controlling the flow of said agent onto said condenser/evaporator; and control means responsive to the temperature of said surface for operating said closure means upon the temperature of said surface falling to about 0°C.

9. The apparatus defined in claim 6, further comprising a droplet separator in said housing between said condenser/evaporator and said reheater/condenser for recovering water droplets from dehumidifed air traversing said housing.

10. The apparatus defined in claim 9, further comprising:

a reservoir containing an antifreeze agent;

means communicating with said reservoir for dispensing said antifreeze agent on a surface of said droplet separator;

closure means between said reservoir and the last-mentioned means for controlling the flow of said agent onto said droplet separator; and control means responsive to the temperature of said surface for operating said closure means upon the temperature of said surface falling to about 0°C.

11. The apparatus defined in claim 2 wherein said means for dehumidifying the air of each blower comprises:

a generally tubular housing having an inlet at one end receiving ambient air and an outlet at the other end for issuing the respective jet;

a fan in said housing adjacent said outlet;

a reheater/condenser upstream of said fan in said housing and traversed by dehumidified air therein;

a condenser/evaporator in said housing upstream of said reheater/condenser and traversed by moist air entering said housing through said inlet;

a compressor; and means connecting said compressor, said condenser/evaporator and said reheater/condenser in a closed refrigerant cycle.

12. The apparatus defined in claim 11, further comprising:

a reservoir containing an antifreeze agent;

means communicating with said reservoir for dispensing said antifreeze agent on a surface of said condenser/evaporator;

closure means between said reservoir and the last-mentioned means for controlling the flow of said agent onto said condenser/evaporator; and control means responsive to the temperature of said surface for operating said closure means upon the temperature of said surface falling to about 0°C.

13. The apparatus defined in claim 11, further comprising a droplet separator in said housing between said condenser/evaporator and said reheater/condenser for recovering water droplets from dehumidified air traversing said housing.

14. The apparatus defined in claim 13, further comprising:
a reservoir containing an antifreeze agent;
means communicating with said reservoir for dispensing said antifreeze agent on a surface of said droplet separator;
closure means between said reservoir and the last-mentioned means for controlling the flow of said agent onto said droplet separator; and
control means responsive to the temperature of said surface for operating said closure means upon the temperature of said surface falling to about 0°C.

15. The apparatus defined in claim 3 wherein said means for dehumidifying the air of each blower comprises:
a generally tubular housing having an inlet at one end receiving ambient air and an outlet at the other end for issuing the respective jet;
a fan in said housing adjacent said outlet
a reheater/condenser upstream of said fan in said housing and traversed by dehumidified air therein;
a condenser/evaporator in said housing upstream of said reheater/condenser and traversed by moist air entering said housing through said inlet;
a compressor; and
means connecting said compressor, said condenser/evaporator and said reheater/condenser in a closed refrigerant cycle.

16. The apparatus defined in claim 15, further comprising:
a reservoir containing an antifreeze agent;
means communicating with said reservoir for dispensing said antifreeze agent on a surface of said condenser/evaporator;
closure means between said reservoir and the last-mentioned means for controlling the flow of said agent onto said condenser/evaporator; and
control means responsive to the temperature of said surface for operating said closure means upon the temperature of said surface falling to about 0°C.

17. The apparatus defined in claim 15, further comprising a droplet separator in said housing between said condenser/evaporator and said reheater/condenser for recovering water droplets from dehumidified air traversing said housing.

18. The apparatus defined in claim 17, furtther comprising:
a reservoir containing an antifreeze agent;
means communicating with said reservoir for dispensing said antifreeze agent on a surface of said droplet separator;
closure means between said reservoir and the last-mentioned means for controlling the flow of said agent onto said droplet separator; and
control means responsive to the temperature of said surface for operating said closure means upon the temperature of said surface falling to about 0°C.

19. The apparatus defined in claim 4 wherein said means for dehumidifying the air of each blower comprises:
a generally tubular housing having an inlet at one end receiving ambient air and an outlet at the other end for issuing the respective jet;
a fan in said housing adjacent said outlet;
a reheater/condenser upstream of said fan in said housing and traversed by dehumidified air therein;
a condenser/evaporator in said housing upstream of said reheater/condenser and traversed by moist air entering said housing through said inlet;
a compressor; and
means connecting said compressor, said condenser/evaporator and said reheater/condenser in a closed refrigerant cycle.

20. The apparatus defined in claim 19, further comprising:
a reservoir containing an antifreeze agent;
means communicating with said reservoir for dispensing said antifreeze agent on a surface of said condenser/evaporator;
closure means between said reservoir and the last-mentioned means for controlling the flow of said agent onto said condenser/evaporator; and
control means responsive to the temperature of said surface for operating said closure means upon the temperature of said surface falling to about 0°C.

21. The apparatus defined in claim 19, further comprising a droplet separator in said housing between said condenser/evaporator and said reheater/condenser for recovering water droplets from dehumidified air traversing said housing.

22. The apparatus defined in claim 21, further comprising:
a reservoir containing an antifreeze agent;
means communicating with said reservoir for dispensing said antifreeze agent on a surface of said droplet seperator;
closure means between said reservoir and the last-mentioned means for controlling the flow of said agent onto said droplet separator; and
control means responsive to the temperature of said surface for operating said closure means upon the temperature of said surface falling to about 0°C.

* * * * *